United States Patent
Bartha et al.

(10) Patent No.: US 6,740,612 B2
(45) Date of Patent: May 25, 2004

(54) RESISTOR FOR REFRACTORY SHAPED BODIES, AND SHAPED BODIES DERIVED THEREFROM

(75) Inventors: Peter Bartha, Bovenden (DE); Hans-Jurgen Klischat, Gleichen (DE); Holger Wirsing, Goettingen (DE); Guido Weibel, Scheden (DE)

(73) Assignee: Refratechnik Holding GmbH, Ismaning (DE)

( * ) Notice: Subject to any disclaimer, the term of this patent is extended or adjusted under 35 U.S.C. 154(b) by 0 days.

(21) Appl. No.: 10/115,575

(22) Filed: Apr. 3, 2002

(65) Prior Publication Data
US 2002/0190243 A1 Dec. 19, 2002

(30) Foreign Application Priority Data
Apr. 5, 2001 (DE) .......................................... 101 17 028

(51) Int. Cl.$^7$ ............................ C04B 35/01; C04B 35/03
(52) U.S. Cl. .................... 501/94; 501/112; 501/113; 501/115; 501/120; 501/127
(58) Field of Search ................... 501/94, 112, 113, 501/115, 120, 127

(56) References Cited

U.S. PATENT DOCUMENTS

| | | | | | |
|---|---|---|---|---|---|
| 5,135,896 A | * | 8/1992 | Vezza | .......................... | 501/120 |
| 5,569,631 A | * | 10/1996 | Harmuth et al. | ............ | 501/112 |
| 5,573,987 A | * | 11/1996 | Harmuth et al. | ............ | 501/108 |
| 5,723,394 A | * | 3/1998 | Harmuth et al. | ............ | 501/112 |
| 6,261,983 B1 | * | 7/2001 | Gruver | ....................... | 501/120 |
| 6,482,760 B1 | * | 11/2002 | Buchebner et al. | ......... | 501/120 |

* cited by examiner

Primary Examiner—Karl Group
(74) Attorney, Agent, or Firm—Goodman & Teitelbaum, Esqs.

(57) ABSTRACT

A resistor, which is solidified from a melt, is provided for a refractory shaped body, and includes a refractory mineral metal-oxide main component having elasticizers a general formula $A^{2+}B^{3+}_2O_4$ in an amount so that solubility of the main component for the elasticizer is exceeded with the elasticizers providing precipitation areas in the main component. The resistor is produced by a joint melting of the main component and the oxides which form the elasticizers. A process is provided for the production of the resistor.

14 Claims, 3 Drawing Sheets

RESISTOR FOR REFRACTORY SHAPED BODIES, AND SHAPED BODIES DERIVED THEREFROM

BACKGROUND OF THE INVENTION

The invention relates to a resistor for refractory shaped bodies and to a process for producing the resistor and to shaped bodies derived therefrom.

In the text which follows, the term resistor denotes the provider of the refractory quality and therefore usually also the main component of a refractory shaped body or refractory compounds. In the most general situation, this resistor may be a metal-oxide, mineral, refractory substance, such as MgO, $Al_2O_3$, doloma or the like.

In the text which follows, the term elasticizer denotes minerals which, on account of an inherent, relatively high refractory quality but a thermal expansion which differs from that of the resistor, through the formation of microcracks and further effects, lead to an increase in the thermal shock resistance of a mixture of resistor and elasticizer compared to the pure resistor.

Refractory shaped bodies, in particular basic, refractory materials based on magnesia and doloma are used in all high-temperature processes with basic slag attack, for example in the production of cement, lime, dolomite, iron and steel and in the production of non-ferrous metals and in the glass industry, as lining material for kilns, furnaces and vessels. However, if they have a high refractory quality and good chemicals resistance, these materials or shaped bodies are highly brittle, i.e. have a high modulus of elasticity.

In this context, it should be noted that shaped bodies based on fused magnesia are considerably more brittle than shaped bodies based on sintered magnesia. However, by its very nature fused magnesia has a considerably higher resistance to thermochemical attack than sintered magnesia. To this extent, it would be desirable to use fused magnesia or shaped bodies or compounds based on fused magnesia in areas in which there is a high thermochemical attack, in particular an attack from low-viscosity, basic slags. This is the case in particular in rotary tubular kilns for cement production. Particularly in cement rotary tubular kilns, however, there is a considerable mechanical load on the refractory lining, so that known shaped bodies based on-fused magnesia cannot successfully be used in firing units of this type, since their brittleness means that they are unable to withstand the stresses introduced, in particular the ring strains.

Shaped bodies based on fused magnesia are inferior to shaped bodies based on sintered magnesia in firing units of this type even if the shaped body is elasticized.

In the past, numerous measures have been taken for elasticizing, i.e. for improving the thermal shock resistance (TSR) of basic, refractory materials. For example, it is proposed in Harders/Kienow, Feuerfestkunde, Herstellung, Eigenschaften und Verwendung feuerfester Baustoffe [Refractory engineering, production, properties and use of refractory construction materials], Springer-Verlag 1960, Chapter 5.5, page 755, to mix basic, refractory materials with chrome ore, this reference in particular defining the quantity of chrome ore and the optimum grain size fraction of the chrome ore. To achieve a sufficient thermal shock resistance, quantities of chrome ore of between 15 and 30% by weight are required. The elasticizing action, i.e. the action of reducing the modulus of elasticity, of the chrome ore as thermal shock resistance component is explained by W. Späth in "Zur Temperaturwechselbeständigkeit feuerfester Stoffe" [On the thermal shock resistance of refractory materials], Radex-Rundschau, Volumes 1960–1961, page 673–688, Österreichisch-Amerikanische Magnesitaktiengesellschaft, Radenthein/Kärnten, caused by micro-structural stresses on account of different coefficients of thermal expansion between magnesia and chrome ore. However, major drawbacks of the use of chrome ore as a means of improving the thermal shock resistance are that, when the furnace atmosphere is changed, material fatigue occurs and that, as a result of oxidation under the action of alkalis, the chromium oxide which is present in trivalent form in the chrome ore is converted into toxic hexavalent chromium oxide, with all the associated problems with regard to safety at work and disposal.

Furthermore, it is known from Austrian Patent AT 158 208 to add alumina powder, corundum powder and aluminum powder to magnesia bricks in order to improve the thermal shock resistance, spinel being formed in situ during firing of the bricks. The aluminum-magnesium spinel formed is concentrated in the matrix and is in some cases not fully reacted, so that when such bricks are attacked by slags, the matrix, which is of crucial importance for the strength, is preferentially destroyed. Also, a magnesium-aluminum spinel of this type has a different coefficient of thermal expansion from that of pure magnesia, so that in this way micro-structural stresses and therefore microcracks likewise result.

For the first time, it was possible to considerably improve both the thermal shock resistance and the chemicals resistance of magnesia bricks by adding pre-synthesized magnesium-aluminum spinel, in the form of sintered or fused spinel, the quantities added usually being between 15 and 25% by weight. By this measure, it is possible to reduce the modulus of elasticity to approximately 20 $kN/mm^2$. However, as before there are drawbacks in that this spinel component reacts readily with slags, and therefore wear takes place in the region of the spinel matrix, which ultimately also leads to accelerated breakdown of the resistor.

DE 35 27 789 A1 has disclosed a coarse ceramic shaped body which has a microcrack system which is distributed substantially homogeneously in the shaped-body microstructure. This publication is based on the discovery that a low modulus of elasticity combined, at the same time, with a high resistance to attack from slags can be produced by a microcrack-forming agent of much greater diameter than in the case of, for example, dense oxide-ceramic high-temperature materials being distributed homogeneously in the shaped-body micro-structure, the mechanism being based either on this agent triggering expansion of the relevant particles, i.e. a volume-increasing reaction, during the firing process or the sintering firing of bricks, in which case the microcrack system is then formed in the adjacent, other particles, or considerable shrinkage in the meal fraction being produced, which in turn leads to the described microcrack system in the other particles of the mix. For this purpose, pure magnesia and alumina are mixed in a stoichiometric ratio which corresponds to the magnesium aluminate spinel and are shaped into mixed particles, which are then added to the base batch of sintered magnesia. Refractory shaped bodies of this type have inherently proven their worth. Particularly when used in units which are highly mechanically stressed with a high level of basic slag attack, such as rotary tubular kilns used in the cement industry, however, rapid wear takes place with shaped bodies of this type as well.

DE 44 03 869 A1 has disclosed a refractory, ceramic compound and its use, this refractory, ceramic compound apparently comprising 50 to 97% by weight of sintered MgO and 3 to 50% by weight of a spinel of the hercynite type. In this document, it is stated that, for example for lining industrial furnaces or kilns in which there is a significant mechanical load on the refractory lining, there is a need for products whose brittleness is as low as possible. These furnaces and kilns apparently include rotary kilns used in the cement industry, where kiln deformation can lead to considerable mechanical stresses on the refractory lining, but would also encompass furnaces used in the steel making and nonferrous metals industry, where in particular thermal stresses during heating and in the event of temperature changes would lead to problems. With respect to chrome ore-containing bricks, it is proposed for the elasticizer used to be hercynite or a spinel which is similar to hercynite, in which case the hercynite-like spinel is to lie within the following ranges for the ternary phase diagram FeO—$Al_2O_3$—MgO:

23 to 55% by weight of FeO

<15% by weight of MgO 54 to 65% by weight of $Al_2O_3$

<3% by weight of impurities

The refractory bricks which are produced using this spinel and are fired are supposed to have a considerably improved ductility. Furthermore, it is stated in this document that sintered magnesia could also be replaced by fused magnesia. However, with refractory products of this type, it is a drawback that the spinels of the hercynite type tend to dissolve and incorporate MgO from the refractory resistor. The solubility limit of the spinel of the hercynite type for MgO is 15 to 20%. Conversely, MgO is able to take up parts of the hercynite spinel or of the oxides which form it, namely FeO and $Al_2O_3$. Therefore, in refractory shaped bodies of this type, undesirable microstructural weakening through diffusion processes and as a result of the constituents partially dissolving one another has been observed, there being a considerable diffusion gradient in the direction from MgO to the spinel on account of the higher diffusion rate of the $Mg^{2+}$ (W. Schulle, Feuerfeste Werkstoffe [Refractory Materials], Deutscher Verlag für Grundstoffindustrie, 1990, p. 254). A further drawback is that, when using fused magnesia, the elasticizing fraction of the spinel is not sufficiently high to make this resistor suitable for rotary tubular kilns given a sufficiently high thermochemical stability.

BRIEF SUMMARY OF THE INVENTION

It is an object of the invention to provide a refractory resistor which, while having a very high thermochemical stability, also has sufficient ductility even for use in mechanically highly loaded units.

The object is achieved by a refractory resistor having the features set forth below.

A further object is to provide a process for producing the resistor and a refractory shaped body derive therefrom.

This object is achieved by a process having the features set forth below. Advantageous configurations and refinements are characterized below.

According to the invention, a fused magnesia or, in general, a melted and therefore inherently brittle resistor is conditioned in such a manner that it has a high ductility or increased elasticity, so that this resistor, while having a high thermochemical stability, can also be used in mechanically highly loaded units, such as rotary tubular kilns. According to the invention, this is achieved by the fact that spinel-forming agents are added to the resistor during the melting operation, in such a manner that the resistor grains which are formed after the melting have precipitations or precipitation areas in which spinel is concentrated. In this case, the addition of spinel-forming agents is metered in such a manner that the solubility of the resistor for this spinel-forming agent is exceeded, it being possible for the number and, surprisingly, also the size of the precipitation areas to be determined by the precise metering of the spinel-forming agent.

A further surprise is that sufficient elasticizing of the melted resistor is possible, even though no visible microcrack system is thereby generated between the individual fused-magnesia or fused-resistor grains which are joined to one another during the sintering firing.

A further advantage in a resistor which has been conditioned in this manner is that the elasticizer, which in terms of chemicals resistance represents the weak point of the brick, is protected from the slags by the chemically more resistant resistor. In this case, with the inventive added quantities of spinel-forming agents, it is even possible to achieve elasticizing capacities which are so high that the resistor is conditioned to such an extent that, in addition to its "internal" elasticizer (precipitation areas), it does not require any further external additions of elasticizer in the batch.

Naturally, it is nevertheless possible to add further elasticizers (external elasticizers).

It has been found that it is particularly advantageous for the external elasticizer used to be a spinel, as is also employed as an internal elasticizer. This is attributed to the fact that the resistor is so well saturated with the spinel on account of its inherent elasticizing that as a result diffusion is inhibited or reduced. As a result, the influences of diffusion, for example of a pure hercynite, on the resistor are suppressed.

In the principal application area according to the invention, namely fused magnesia, it is preferable to add FeO and $Al_2O_3$ or $Fe_2O_3$ and $Al_2O_3$, so that the precipitation areas are formed substantially from a pleonaste spinel or a spinel of the pleonaste type. It has been found that this elasticizer of the pleonaste type, both internally and externally, has a considerably improved compatibility with the resistor, with sufficient elasticizing being ensured. Furthermore, compared to known elasticizers, this elasticizer has an increased thermochemical resistance.

BRIEF DESCRIPTION OF THE SEVERAL VIEWS OF THE DRAWINGS

The invention is explained below by way of example with reference to a drawing, in which.

DETAILED DESCRIPTION OF THE INVENTION

According to the invention, a resistor, i.e. the provider of the refractory quality of a refractory mix, usually has a metal-oxide, mineral, grain component [lacuna] segregation areas of spinel. In particular, according to the invention, a resistor based on MgO is selected, this resistor consisting of a doped magnesium oxide which includes segregations of spinel. The spinel itself may have a composition corresponding to $(Fe, Mg, Mn, Zn)^{2+} (Fe, Al, Mn)^{3+}_2 O_4$. The quantity of these spinel segregations in the magnesia or the refractory resistor may be between 2 and 25% by mass. This spinel segregation is advantageously used in molten magnesium oxide, known as fused magnesia.

In the shaped body according to the invention, corrosion is less possible, since the spinel is incorporated in the MgO grain and, as a result, the microstructure retains its elasticity over a prolonged period. By contrast, in the prior art, after the elasticizer has been worn away, what remains is a framework comprising a brittle material which, after the elasticizer has been worn away, can be worn away more quickly. Locally increased levels of corrosion products, which occur in shaped bodies in which the elasticizers are in grain or locally highly enriched form, are also avoided.

Figure 1:
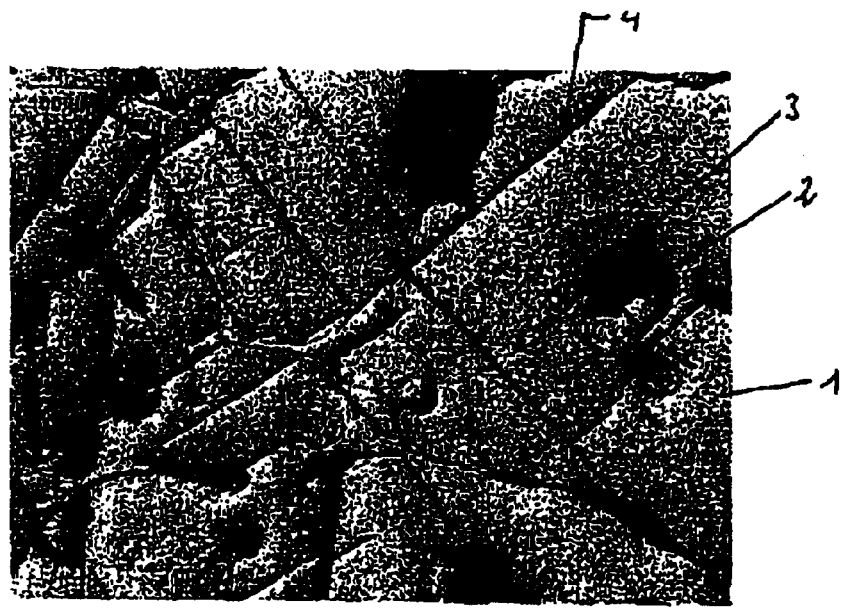
FIG. 1 shows a fused grain according to the invention comprising MgO with pleonastic, punctiform segregations in the grain and at the grain boundaries.
Figure 2:
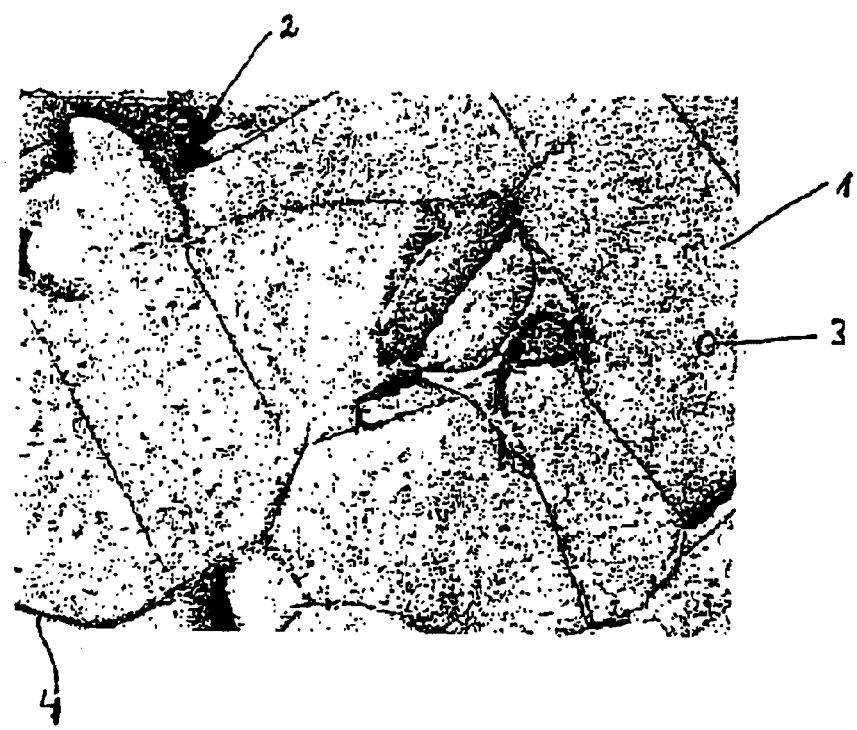
FIG. 2 shows a further image of a fused grain according to the invention comprising MgO with punctiform aluminum spinel segregations in the grain and at the grain boundaries.

As the two illustrations given in FIG. 1 and FIG. 2 show, the spinel segregations are distributed relatively evenly, in a punctiform manner, throughout the entire fused grain, with spinel segregations naturally also being present in the grain boundary regions. However, should they become corroded, they represent only a small proportion of the spinel segregations which are actually present, so that even the elasticizing action of the spinel segregations is only minimally impaired. It is therefore possible, with a shaped body which contains the fused magnesia which has been elasticized according to the invention, to line thermomechanically sensitive units, with a reduced thermomechanical sensitivity compared to the previous prior art, since the grain already has improved elasticity and plasticity, and the resistance to corrosion is also improved. These effects can be detected firstly by means of the modulus of elasticity, as a measure of the elasticity, and secondly via $D_{max}$ from measurement of the softening under load in accordance with DIN 51053 (with a mechanical load of 0.2 N/mm$^2$) as a measure for the ring strain or the plastic deformation, since if $D_{max}$ is high, higher stresses also build up, leading to flaking of brick layers and therefore to premature destruction of the refractory lining. If $D_{max}$ is low, the mechanical stresses can be broken down without destruction on account of plastic phenomena.

In the illustrations shown in FIG. 1 and FIG. 2, the large, white areas 1 are periclase crystals which abut one another in the region of the indicated cracks or grain boundaries 4. The punctiform spinel segregations 3 can be seen in the periclase crystals, with voids or pores 2 being present. The punctiform segregations 3 in FIG. 1 are pleonastic spinels, while the punctiform segregations 3 in FIG. 2 are magnesium-aluminum spinels.

In principle, a fused magnesia which has been conditioned in this manner can also be used together with conventional sintered magnesia if this is desired for certain reasons, for example cost reasons.

The starting materials used are in particular caustic magnesia, magnesium hydroxide and magnesite, while to form the spinel segregations aluminum oxide, for example in the form of tabular alumina, and iron oxide, for example in the form of magnetite, are added.

Of course, to form spinel segregations, it is also possible for only aluminum oxide to be added, in order to form aluminum-magnesium spinel. Furthermore, it is, of course, possible for all spinel-forming minerals to be added in accordance with a stoichiometrically required quantity as spinel-forming agents, i.e. the corresponding oxides of the elements iron, magnesium, manganese and aluminum or further possible spinel-forming agents.

Therefore, in the case of fused magnesia, it is possible, for example, for the corresponding oxides of iron, of manganese and of aluminum to be added. In the case of a resistor based on $Al_2O_3$, accordingly the oxides of iron, manganese and magnesium could be added.

Figure 3:
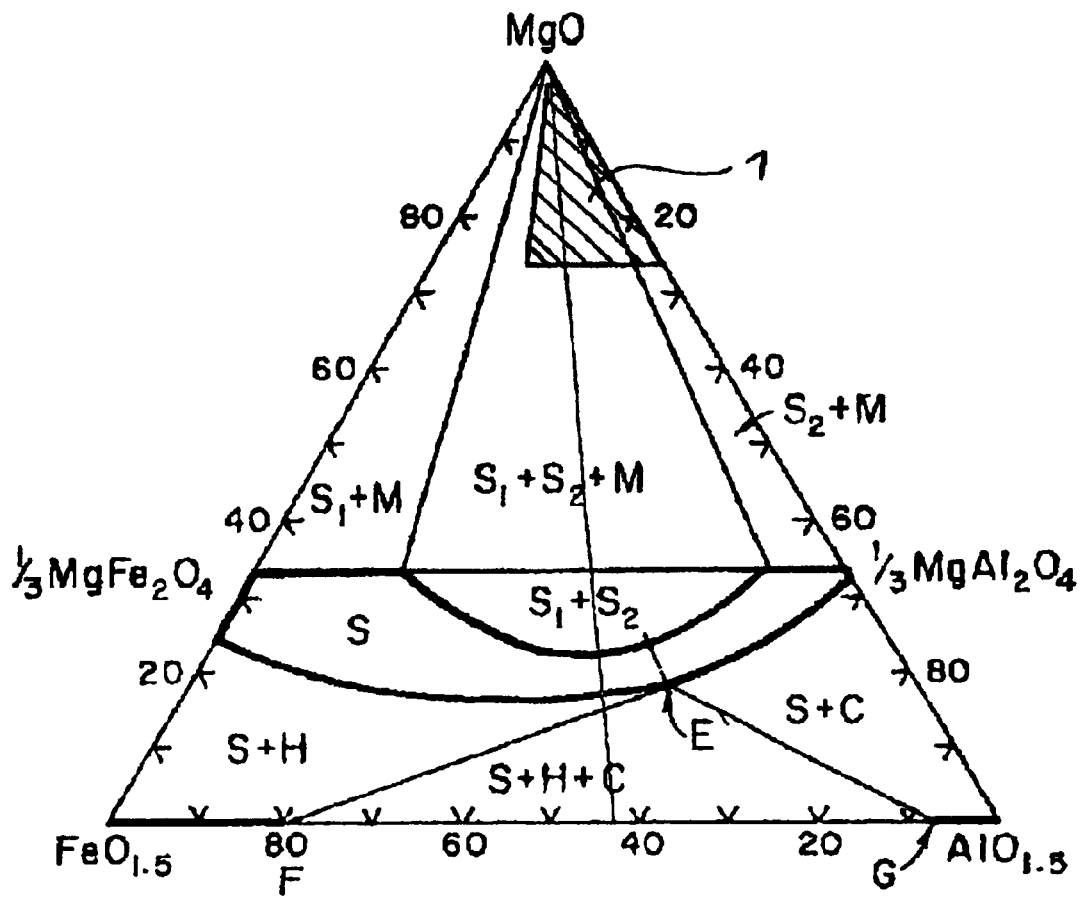
FIG. 3 shows the composition range of a resistor which has been conditioned in accordance with the invention and is based on periclase in the ternary $FeO_x$—$Al_2O_3$—MgO system.

FIG. 3 illustrates, by way of example, the diagram of a self-elasticized periclase according to the invention with a hatched area 1.

The invention is explained below with reference to exemplary embodiments.

EXAMPLE 1

Figure 4:
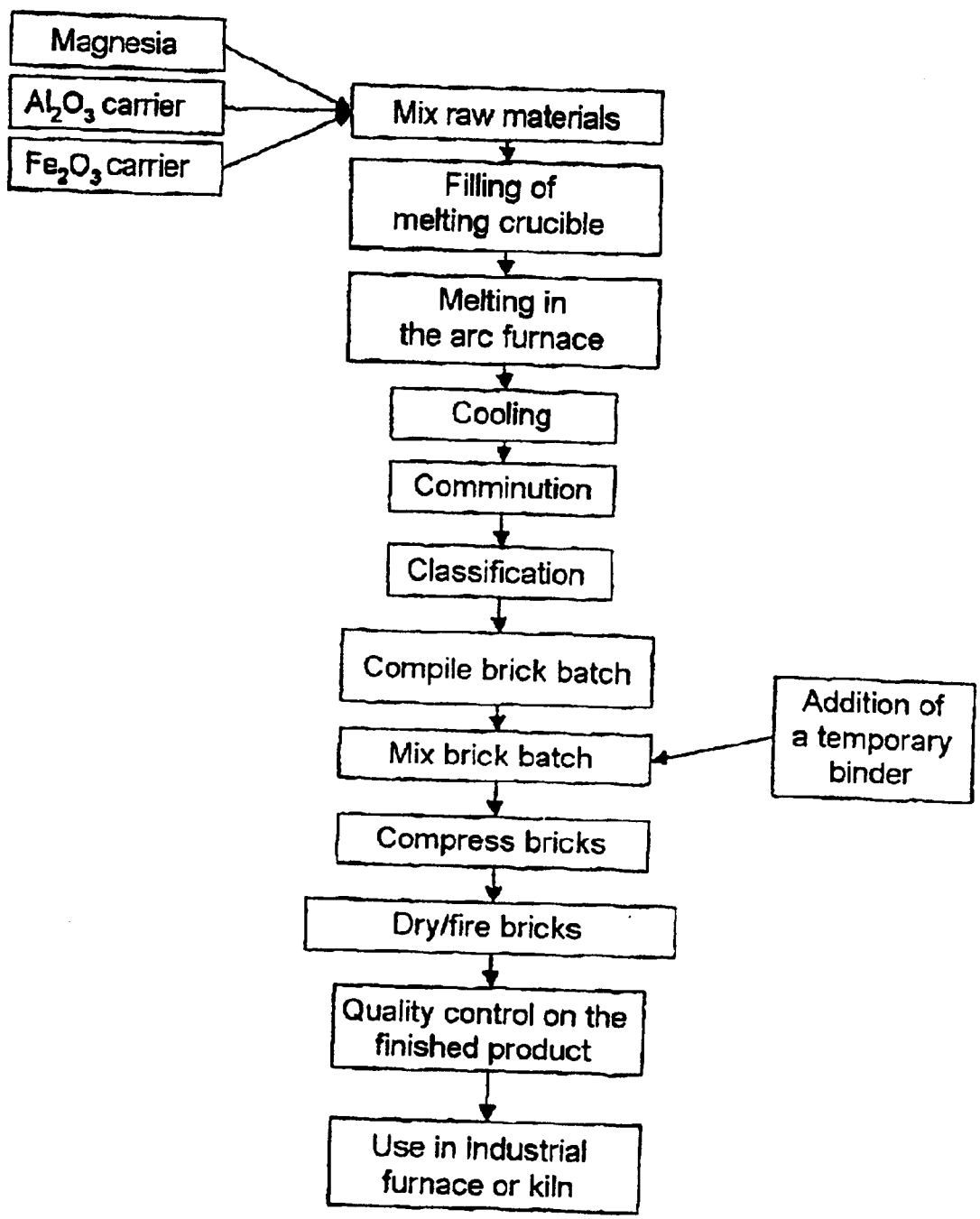
FIG. 4 shows the process flowchart for production of the resistor according to the invention and shaped bodies derived therefrom.

90% of a caustic magnesia, 4.4% of iron oxide and 5.6% of aluminum oxide are melted in an electric arc furnace at a temperature of approx. 3000° C. (FIG. 4). After the melting process and the subsequent cooling, the melted product is prepared in fractions of 0 to 1 mm, 1 to 2 mm, 2 to 4 mm and meal. The batch composition for producing the refractory shaped body is according to a typical Fuller curve. The grain size produced by the composition of the fractions is mixed with a required quantity of lignin sulfonate and is compressed under a specific pressure of 130 MPa to form shaped bodies.

After drying, the brick is fired at a sintering temperature of approx. 1600° C. For comparison purposes, the same batch is produced using a magnesia which is likewise melted but does not contain any additional iron oxide or any additional aluminum oxide. After the brick firing, the elastic property and the thermomechanical parameter $D_{max}$ are measured on this brick, in order to make it possible to reach a judgement about the elastic and plastic behavior.

The properties produced are given in the table below:

TABLE 1

|  | Magnesia brick | Magnesia brick with pleonaste segregations |
|---|---|---|
| Bulk density g/cm$^3$ | 3.03 | 3.03 |
| Porosity % | 15.12 | 15.05 |
| Modulus of elasticity GPa | 98.3 | 34.5 |
| G modulus GPa | 43.2 | 16.8 |
| Cold compression strength MPa | 91.3 | 88.8 |
| TSR according to DIN 51068 | 4 | >20 |
| DE: $D_{max}$ % according to DIN 51053 | 2.11 | 1.68 |

It can be seen from this table that the values for the elastic properties of a magnesia brick which is formed from a resistor with pleonaste segregations are well below the typical values for pure magnesia bricks. At the same time, on account of the plastic, crack-free reduction of stresses, the $D_{max}$ value is surprisingly reduced by more than 20%, with the result that the mechanical stresses which are formed in an annular unit or when the lining is clamped in a mechanical frame, for example in the case of a stationary furnace, are likewise reduced significantly.

EXAMPLE 2

85% of magnesia and 15% of aluminum oxide are melted in an electric arc furnace at a temperature of approx. 3000°

C. (FIG. 4). The fused product contains segregations of magnesium-aluminum spinel, as illustrated in FIG. 2. After the melting process, this material is prepared in fractions of 0 to 1 mm, 1 to 2 mm, 2 to 4 mm and meal. The batch composition for producing a refractory shaped body is according to a typical Fuller curve. The grain size fraction which is compiled from the individual fractions according to the Fuller curve is mixed with a quantity of lignin sulfonate which per se is conventional and necessary, as temporary binder and is compressed under a specific pressure of 130 MPa. After drying, the shaped body is fired at a sintering temperature of 1600° C. A shaped body made from pure magnesia, as in Example 1, is used for comparison. The measured variables correspond to those measured in Example 1. The properties achieved are listed in the following table:

TABLE 2

|  | Magnesia brick | Magnesia brick with pleonaste segregations |
| --- | --- | --- |
| Bulk density g/cm³ | 3.03 | 2.99 |
| Porosity % | 15.12 | 15.23 |
| Modulus of elasticity GPa | 98.3 | 16.7 |
| G modulus GPa | 43.2 | 7.5 |
| Cold compression strength MPa | 91.3 | 79.3 |
| TSR according to DIN 51068 | 4 | >20 |
| DE: $D_{max}$ % according to DIN 51053 | 2.11 | 1.66 |

This table too reveals that the values achieved for the elastic properties of the resistor which has spinel segregations are well below the typical values for pure magnesia bricks. At the same time, on account of the plastic, crack-free breakdown of stresses, the $D_{max}$ value is likewise reduced by more than 20%, with the result that the mechanical stresses in refractory linings of an industrial furnace or kiln are also reduced considerably.

Shaped bodies which have been produced in accordance with the invention can be used wherever high mechanical and thermomechanical stresses occur. Compared to shaped bodies which have been known hitherto, with the inherently brittle MgO grain, in particular fused grain, the resistor according to the invention has an increased plasticity and elasticity. In this case, it is advantageous that the elasticity and the plasticity in resistors which have been produced in accordance with the invention are produced in the grain itself.

Naturally, the use of the resistor which is produced according to the invention does not rule out an application in refractory shaped bodies which contain further elasticizers, such as spinel, hercynite, zirconium oxide or chrome ore. In this case, the positive effects of the self-elasticized resistors and of the added elasticizers may be cumulative, resulting in a further improved elasticity and high-temperature plasticity. This can be seen from the following table:

TABLE 3

|  | Magnesia brick | Magnesia brick with spinel segregations | Magnesia brick with pleonaste segregations and 15% of spinel |
| --- | --- | --- | --- |
| Bulk density g/cm³ | 3.03 | 2.99 | 2.99 |
| Porosity % | 15.12 | 15.23 | 15.31 |
| Modulus of elasticity GPa | 98.3 | 16.7 | 15.6 |

TABLE 3-continued

|  | Magnesia brick | Magnesia brick with spinel segregations | Magnesia brick with pleonaste segregations and 15% of spinel |
| --- | --- | --- | --- |
| G modulus GPa | 43.2 | 7.5 | 7.2 |
| Cold compression strength MPa | 91.3 | 79.3 | 61.8 |
| TSR according to DIN 51068 | 4 | >20 | >30 |
| DE: $D_{max}$ % according to DIN 51053 | 2.11 | 1.66 | 1.65 |

Furthermore, it is, of course, also possible for resistors which have been produced in accordance with the invention to be used together with other conventional resistors in refractory compounds or shaped bodies.

What is claimed is:

1. A resistor, which is solidified from a melt, and which is provided for a refractory shaped body, comprising:

a refractory mineral metal-oxide main component, the main component having elasticizers of a general formula $A^{2+}B^{3+}_2O_4$ in an amount so that solubility of the main component for the elasticizer is exceeded, the elasticizers providing precipitation areas in the main component, and the resistor being produced by a joint melting of the main component with oxides which form the elasticizers.

2. The resistor as claimed in claim 1, wherein the main component contains MgO.

3. The resistor as claimed in claim 1, wherein the main component contains $Al_2O_3$.

4. The resistor as claimed in claim 1, wherein the main component contains doloma.

5. The resistor as claimed in claim 1, wherein the main component is preiclase.

6. The resistor as claimed in claim 1, wherein the main component is corundum.

7. The resistor as claimed in claim 1, wherein the elasticizers are formed from elements $A^{2+}$=Fe, Mg, Mn, Zn and $B^{3+}$=Fe, Al, Mn.

8. The resistor as claimed in claim 1, wherein the elasticizer includes a pleonastic spinel of a general formula (Fe, Mg)$Al_2O_4$.

9. The resistor as claimed in claim 1, wherein the elasticizer includes a MgAl spinel.

10. The resistor as claimed in claim 9, wherein the elasticizer is a pleonastic spinel of a general formula (Fe, Mg)$Al_2O_4$.

11. The resistor as claimed in claim 7, wherein the elasticizer is a MgAl spinel.

12. The resistor as claimed in claim 1, wherein the resistor contains 2 to 25% by mass of the elasticizer.

13. The resistor as claimed in claim 1, wherein the resistor includes 70 to 98% of the refractory mineral metal-oxide main component.

14. The resistor as claimed in claim 1, wherein the resistor is melted from caustic magnesia, magnesium hydroxide or magnesite and iron compounds, or iron oxides including magnetite and alumina.

* * * * *